(12) United States Patent
Kawaguchi et al.

(10) Patent No.: US 12,353,937 B2
(45) Date of Patent: Jul. 8, 2025

(54) ACTIVATION MECHANISMS FOR TRACKING TAGS

(71) Applicant: CHORUSVIEW, INC., Las Vegas, NV (US)

(72) Inventors: Dean Kawaguchi, San Jose, CA (US); Russell Shikami, Cupertino, CA (US)

(73) Assignee: CHORUSVIEW, INC., Las Vegas, NV (US)

( * ) Notice: Subject to any disclaimer, the term of this patent is extended or adjusted under 35 U.S.C. 154(b) by 0 days.

(21) Appl. No.: 18/229,001

(22) Filed: Aug. 1, 2023

(65) Prior Publication Data

US 2024/0070424 A1 Feb. 29, 2024

Related U.S. Application Data

(60) Provisional application No. 63/446,375, filed on Feb. 17, 2023, provisional application No. 63/400,891, filed on Aug. 25, 2022.

(51) Int. Cl.
*G06K 19/077* (2006.01)
*G01S 1/68* (2006.01)
(Continued)

(52) U.S. Cl.
CPC .......... *G06K 19/07722* (2013.01); *G01S 1/68* (2013.01); *G06K 19/0702* (2013.01);
(Continued)

(58) Field of Classification Search
CPC .... G06K 19/07722; H04W 4/029; G01S 1/68
(Continued)

(56) References Cited

U.S. PATENT DOCUMENTS 8,600,374 B1 12/2013 Hertlein et al.
8,672,362 B1 * 3/2014 Holt .......................... G04F 1/00
428/40.1
(Continued)

FOREIGN PATENT DOCUMENTS

KR 101005110 B1 12/2010
WO 2009052455 A1 4/2009
(Continued)

OTHER PUBLICATIONS

International Search Report and Written Opinion for corresponding International Application No. PCT/US2023/030554 dated Nov. 29, 2023 (8 pages).

(Continued)

*Primary Examiner* — Allyson N Trail
(74) *Attorney, Agent, or Firm* — Botos Churchill IP Law LLP

(57) ABSTRACT

Aspects of the disclosure provide systems including linear material and tracking tags. The tracking tag may be at least initially arranged on the liner material. The tracking tag may also include a top layer, beacon transmission circuitry, a bottom layer of adhesive, and an activation mechanism. The activation mechanism may be configured to activate the tracking tag and cause the beacon transmission circuitry to transmit beacon signals in order to enable tracking of the object. The activation mechanism may further include an initially closed circuit, and the activation mechanism may be configured to automatically activate the tracking tag when the tracking tag is removed from the liner material.

18 Claims, 14 Drawing Sheets

(51) Int. Cl.
    *G06K 19/06*     (2006.01)
    *G06K 19/07*     (2006.01)
    *H04W 4/029*     (2018.01)

(52) U.S. Cl.
    CPC ..... *G06K 19/0715* (2013.01); *G06K 19/0772* (2013.01); *G06K 19/0776* (2013.01); *H04W 4/029* (2018.02); *G06K 2019/06253* (2013.01)

(58) Field of Classification Search
    USPC ........................................................ 235/492
    See application file for complete search history.

(56) References Cited

U.S. PATENT DOCUMENTS

| | | | |
|---|---|---|---|
| 8,847,754 | B2 | 9/2014 | Buchheim et al. |
| 10,849,501 | B2 | 12/2020 | Gannon et al. |
| 10,964,197 | B2 | 3/2021 | Krejcarek |
| 11,126,901 | B2 | 9/2021 | Badri et al. |
| 11,232,390 | B1 | 1/2022 | Leung et al. |
| 11,527,148 | B1 | 12/2022 | Volkerink et al. |
| 2006/0125691 | A1 | 6/2006 | Menache et al. |
| 2006/0147792 | A1 | 7/2006 | Guindy et al. |
| 2008/0146958 | A1* | 6/2008 | Guillory ............. A61B 5/4094 600/544 |
| 2010/0234700 | A1* | 9/2010 | Bowers ................ A61B 5/282 600/301 |
| 2012/0161967 | A1 | 6/2012 | Stern |
| 2013/0006326 | A1* | 1/2013 | Ackermann ......... A61N 1/3606 607/53 |
| 2013/0030257 | A1 | 1/2013 | Nakata et al. |
| 2013/0127599 | A1 | 5/2013 | Foster et al. |
| 2014/0284356 | A1 | 9/2014 | Su |
| 2015/0123765 | A1 | 5/2015 | Foster et al. |
| 2017/0220074 | A1 | 8/2017 | Cooper et al. |
| 2018/0172798 | A1 | 6/2018 | Lilly et al. |
| 2018/0253632 | A1 | 9/2018 | Uland et al. |
| 2020/0140163 | A1 | 5/2020 | Novak |
| 2020/0187349 | A1* | 6/2020 | Lee ........................ H05K 1/189 |
| 2020/0200892 | A1* | 6/2020 | Rajab .................... G01S 13/753 |
| 2020/0272986 | A1 | 8/2020 | Bandil et al. |
| 2020/0364523 | A1* | 11/2020 | Badri ................. G06K 19/0702 |
| 2021/0335488 | A1* | 10/2021 | Higginson ........... H04B 17/318 |
| 2021/0383724 | A1 | 12/2021 | Hofenauer et al. |
| 2022/0004834 | A1 | 1/2022 | Perkins et al. |
| 2022/0027698 | A1 | 1/2022 | Volkerink |
| 2022/0225601 | A1* | 7/2022 | Manhas ............. A01M 1/2055 |
| 2023/0004773 | A1 | 1/2023 | Kuechenthal et al. |
| 2023/0165524 | A1* | 6/2023 | Larson .................. G16H 50/30 600/301 |
| 2023/0196267 | A1 | 6/2023 | Leung et al. |
| 2023/0222892 | A1* | 7/2023 | Volkerink ............ G08B 21/182 340/539.2 |
| 2023/0342569 | A1* | 10/2023 | Koprowski ........ G06K 7/10366 |
| 2023/0394257 | A1* | 12/2023 | Andre ................ G06K 7/10366 |
| 2024/0281633 | A1* | 8/2024 | Larose .................... H04W 4/80 |
| 2024/0311060 | A1* | 9/2024 | Wakabayashi ........ G06F 3/1292 |

FOREIGN PATENT DOCUMENTS

| | | |
|---|---|---|
| WO | 2014160372 A1 | 10/2014 |
| WO | 2019055161 A1 | 3/2019 |
| WO | 2020214758 A1 | 10/2020 |

OTHER PUBLICATIONS

Li, "Accurate battery pack modeling for automotive applications" (Year: 2013).

International Search Report and Written Opinion for corresponding International Application No. PCT/US2023/030546 dated Dec. 4, 2023 (10 pages).

I6 Ultra-thin Tag, Thin Than You Think, Minew, downloaded from the internet on Aug. 18, 2022, url: https://www.minew.com/product/i6-ultra-thin-tag/.

\* cited by examiner

100

200

400

420

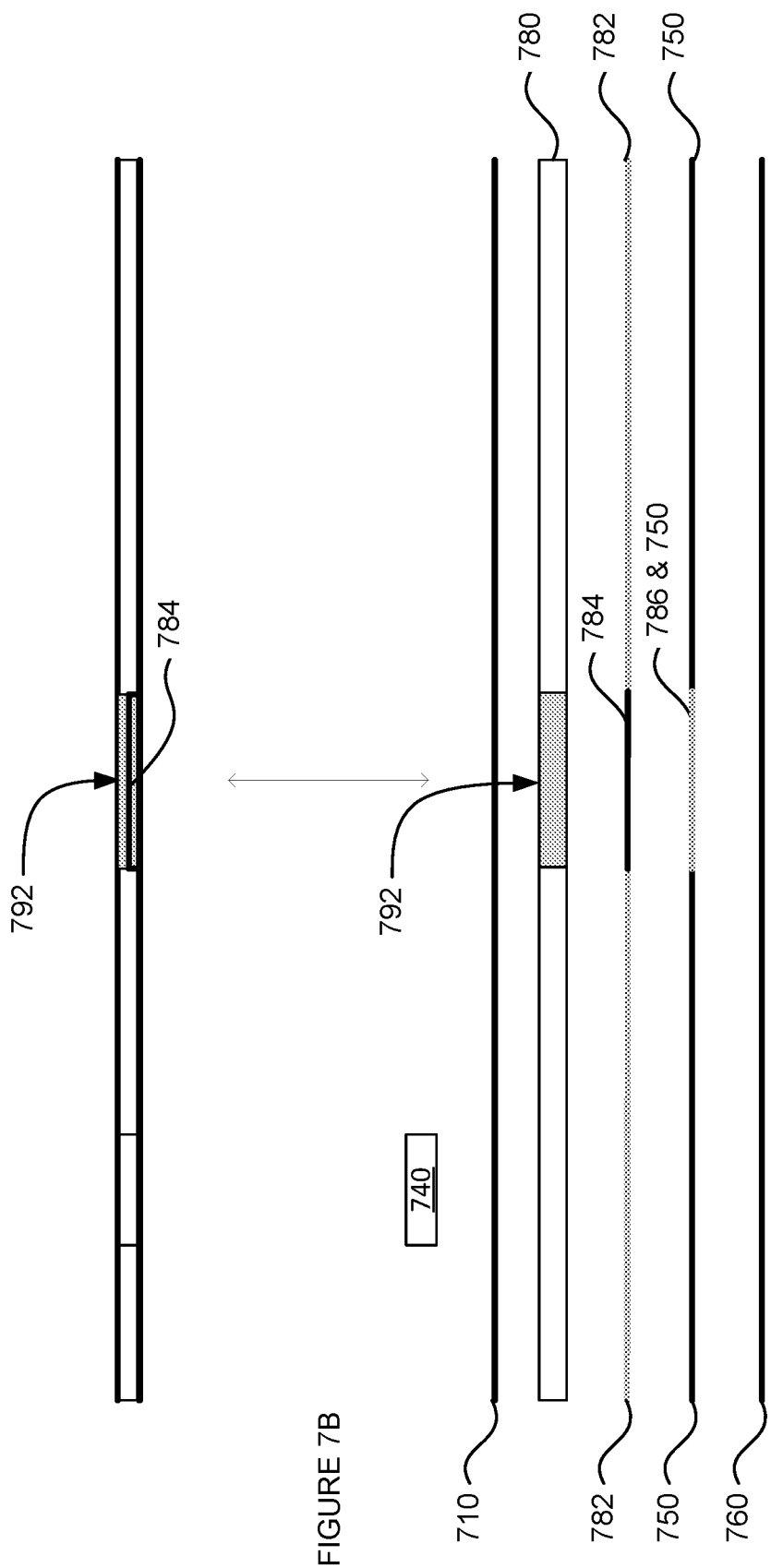

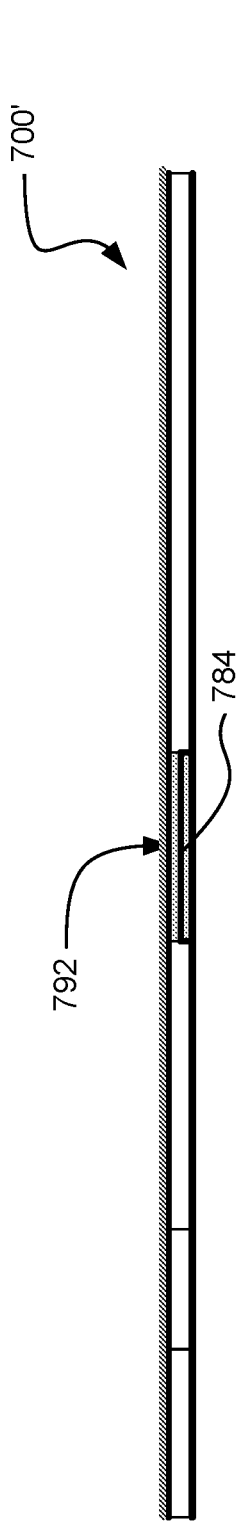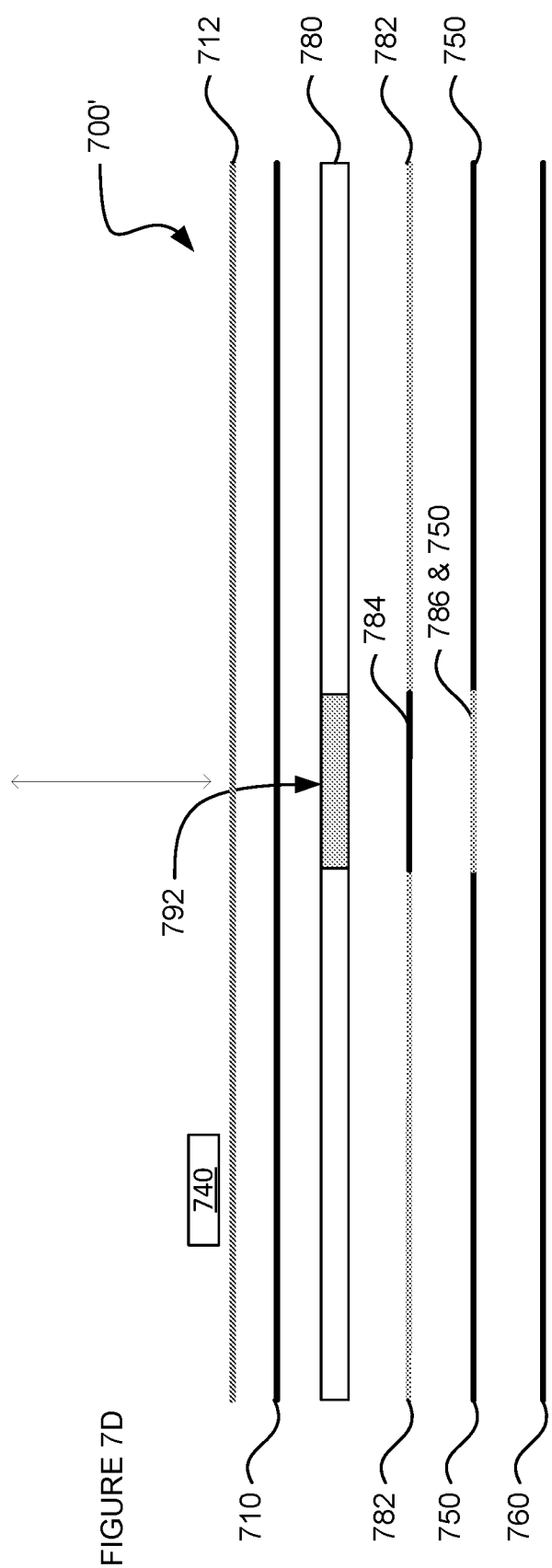
FIGURE 7D
FIGURE 7E

ACTIVATION MECHANISMS FOR TRACKING TAGS

CROSS-REFERENCE TO RELATED APPLICATIONS

The present application claims the benefit of the filing date of U.S. Provisional Application No. 63/446,375, filed Feb. 17, 2023 and U.S. Provisional Application No. 63/400,891, filed Aug. 25, 2022, the entire disclosures of which are incorporated by reference herein.

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS or WiFi may suffer from signal dropout or transmitters going offline, which can reduce the ability to properly identify an object's location.

BRIEF SUMMARY

Aspects of the disclosure provide a system. The system includes liner material and a tracking tag at least initially arranged on the liner material. The tracking tag includes a top layer, beacon transmission circuitry, a bottom layer of adhesive, and an activation mechanism configured to activate the tracking tag and cause the beacon transmission circuitry to transmit beacon signals in order to enable tracking of the tracking tag, wherein the activation mechanism includes an initially closed circuit between the tracking tag and the liner material. The activation mechanism is configured to automatically activate the tracking tag when the tracking tag is removed from the liner material.

In one example, the liner material includes a conductive strip which forms part of the initially closed circuit. In addition or alternatively, the liner material is metalized to provide a conductive connection which forms a part of the initially closed circuit. In another example, the liner material is configured to protect the bottom layer of adhesive before the tracking tag is attached to an object. In addition or alternatively, the initially closed circuit connects one or more batteries to a processor configured to activate the beacon transmission circuitry when the initially closed circuit is broken. In addition or alternatively, the initially closed circuit is configured such that breaking the initially closed circuit activates the tracking tag and causes the beacon transmission circuitry to transmit the beacon signals.

Another aspect of the disclosure provides a method for activating a tracking tag arranged on a liner material. The method includes removing the tracking tag from the liner material. Removing the tracking tag from the liner material causes an initially closed circuit between the tracking tag and the liner material to be broken thereby activating beacon transmission circuitry of the tracking tag to generate beacon signals.

In one example, the liner material includes a conductive strip which forms part of the initially closed circuit, and removing the tracking tag from the liner material separates the tracking tag from the conductive strip. In addition or alternatively, the liner material is metalized to provide a conductive connection which forms a part of the initially closed circuit. In addition or alternatively the method also includes attaching the tracking tag to an object, and the liner material is configured to protect an adhesive backing of the tracking tag before the tracking tag is attached to an object.

Another aspect of the disclosure provides a system. The system includes a liner material and a tracking tag at least initially arranged on the liner material. The tracking tag including a top layer, beacon transmission circuitry, a flex inlay, a conductive trace, a bottom layer of adhesive, and an activation mechanism configured to activate the tracking tag and cause the beacon transmission circuitry to transmit beacon signals in order to enable tracking of the tracking tag, wherein the activation mechanism includes an initially closed circuit including a portion of the conductive trace routed through an area of the flex inlay. The activation mechanism is configured to automatically activate the tracking tag when the tracking tag is removed from the liner material by breaking the portion of the conductive trace.

In one example, the area is die-cut to enable the breaking of the portion of the conductive trace. In addition or alternatively, the liner material is configured to protect the bottom layer of adhesive before the tracking tag is attached to an object. In addition or alternatively, the initially closed circuit connects one or more batteries to a processor configured to activate the beacon transmission circuitry when the initially closed circuit is broken. In addition or alternatively, the initially closed circuit is configured such that breaking the initially closed circuit activates the tracking tag and causes the beacon transmission circuitry to transmit the beacon signals.

Another aspect of the disclosure provides a method for activating a tracking tag arranged on a liner material. The method includes removing the tracking tag from the liner material. Removing the tracking tag from the liner material causes an initially closed circuit including a portion of a conductive trace routed through an area of a flex inlay of the tracking tag, and wherein an activation mechanism is configured to automatically activate the tracking tag when the tracking tag is removed from the liner material by breaking the portion of the conductive trace.

In one example, area is die-cut to enable the breaking of the portion of the conductive trace. In addition or alternatively, the method also includes attaching the tracking tag to an object, and wherein the liner material is configured to protect an adhesive backing of the tracking tag before the tracking tag is attached to an object.

BRIEF DESCRIPTION OF THE DRAWINGS

FIGS. 7A-E are example views of tracking tags in accordance with aspects of the disclosure.

DETAILED DESCRIPTION

Overview

The technology relates to accurate localization and tracking of articles or other objects transported, for example, by logistics providers. In order to track such articles or other objects, tracking tags may be used. Such tracking tags may be active, configured to include a battery or be coupled to another power source. In the case of a battery, delaying activation of the battery until the end user is ready to use the tracking tag is critical to extending the useful life of the tracking tag.

In order to enable the use of the aforementioned tracking tags on as many different types of articles to be shipped and other objects as possible, the tracking tags may be designed to be both thin and flexible. In this regard, the tracking tags may be configured as adhesive shipping labels. In such instances, the tracking tags may be manufactured on a roll of liner material which allows the tracking tags to be printed. When in use, each tracking tag may be peeled off of the roll of liner material and applied to an article to be shipped or another object by a human operator.

Each tracking tag may include various components such as a top layer for printing a label, a flex inlay, beacon transmission circuitry, a bottom layer of adhesive (for attaching the tracking tag to an article to be shipped or another object). The beacon transmission circuitry may include a printed circuit board (PCB) and one or more batteries. The PCB may include various features such as an identifier chip and/or a transmission device for the purposes of transmitting beacon signals.

The tracking tags may also include an activation mechanism configured to activate the tracking tag and initiate transmission of beacon signals by the beacon transmission circuitry. The initially closed circuit may connect to the battery and the processor in order to enable the processor to monitor the continuity of the closed circuit.

The features described herein may provide for a simple, cost effective and useful tracking tag which can be automatically activated without additional steps. The features described herein may also provide for highly reliable tracking tags which are very unlikely to become activated inadvertently and which are more readily manufacturable than previous tracking tags. In addition, logistics companies need not change existing shipping processes by adding additional steps in order to activate a tracking tag. Rather labels may be printed and applied to boxes or envelopes per usual and each tracking tag is automatically activated. Thus, the addition of the benefits of beacon-based tracking will not add additional labor costs. In many instances, this may prevent a human operator from inadvertently forgetting to activate a tracking tag.

Example Systems

Figure 1A:
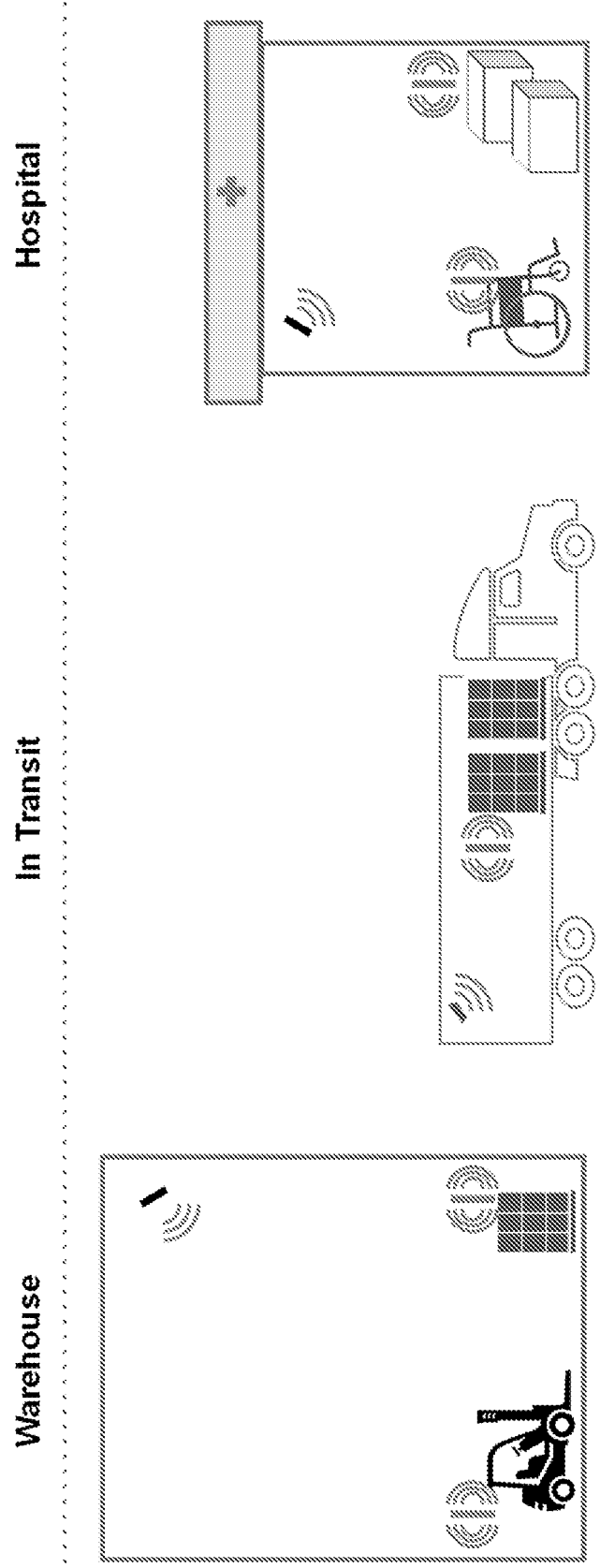
FIG. 1A illustrates various examples for localization of objects in accordance with aspects of the technology.

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right-side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
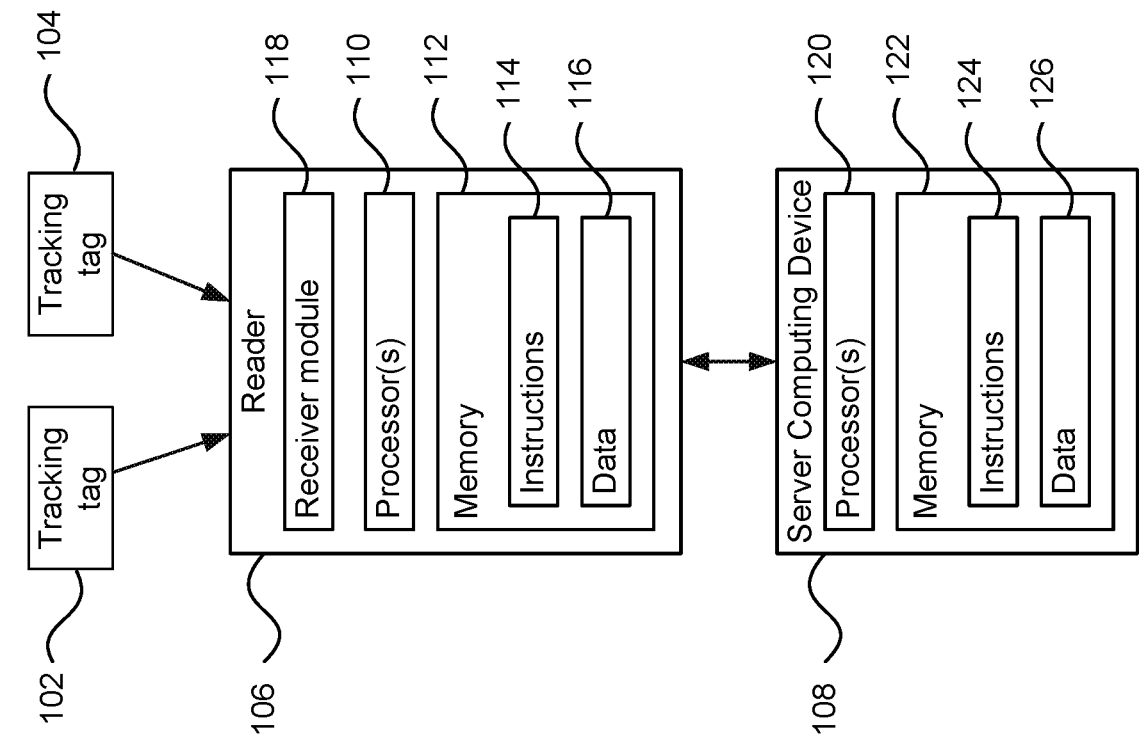
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader 106. As discussed further below, one or more server computing devices 108 may also be part of the tracking system 100. A given tracking tag may be placed on or otherwise attached to or inserted into an object to be tracked, such as a package, a piece of equipment, a vehicle, a warehouse section, a room, etc. While tracking tags 102 may be associated with objects such as packages, equipment or vehicles (e.g., a forklift or an autonomous fulfillment robot that can retrieve packages from different locations in a warehouse), tracking tags 104 may be fixed to an aisle in a warehouse or from a specific room in a hospital. Thus, different tracking tags may be used depending upon customer needs. As an example, different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need such equipment. Each tracking tag 102 or 104 may emit an informational signal, for example a beacon signal, via an antenna, such as using the transmitting device, to communicate data. In this regard, each tracking tag may include an identifier chip (such as for radiofrequency (RF) identification) and/or a transmitting device (such as an RF module configured to transmit beacon signals using a selected frequency band and transmission protocol). In this regard, the beacon signals may simply transmit identifying information in order to enable tracking of objects in the case of tracking tags discussed further below. To facilitate this, each tracking tag may be embedded with a unique identifier, such as a unique MAC address or BLUETOOTH identifier, which may function as a tracking tag identifier. This tracking tag identifier may be assigned to the tracking tag during the manufacturing or provisioning processes (described further below).

The transmitting device may send such information via radio frequency transmission in a selected frequency band, using a standard or proprietary protocol. By way of example, the transmitting device may employ a BLUETOOTH (e.g., a BLUETOOTH Low Energy (BLE)) or 802.11 protocol in the 2.4 GHz and/or 5 GHz frequency bands. In some examples, each beacon tracking tag and each tracking tag uses the BLUETOOTH or BLE protocol.

In some instances, the tracking tags may include one or more sensors. In such instances, the aforementioned communicated data may be formatted according to the selected protocol and include one or more sensed characteristics of the given tracking tag or its environment. For example, the sensed characteristic may be a temperature, light, humidity, a location, motion, battery conditions, trip conditions, and/or other detectable characteristics of the tracking devices or its environment.

The reader 106 may be a computing device configured to detect the beacon signals emitted by the plurality of tracking tags 102 and 104, then store and/or transmit data related to the tracking tags. While only one reader is shown in FIG. 1B, the system may employ multiple readers. The reader 106 may include one or more processors 110, memory 112 and other components typically present in general purpose computing devices. The reader 106 includes a receive module 118 having an antenna and a processing section (not shown), which may include a bandpass filter for the frequency band of interest, an analog to digital (A/D) converter, and a signal processing module to evaluate information in received beacon signals. The processing section may also convert the received beacon signal to a baseband signal, before or after A/D conversion.

The one or more processors 110 may be any conventional processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the one or more processors, memory, and other elements of the reader 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the one or more processors 110. The data may include sensed characteristics from any of the tracking tags 102 and/or 104 received by the reader 106. The memory 112 may be of any type capable of storing information accessible by the one or more processors, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by the one or more processors 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104, may be configured to obtain and communicate data directly to the one or more server computing devices 108. The one or more server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the one or more processors 120. Data 126 and instructions 124 may be the same or similar type as the data 116 and instructions 114, respectively.

After detecting the beacon signals of one or more tracking tags 102 or 104, the reader 106 may transmit the data from the tracking tags to the one or more server computing devices 108 through an existing connection or through a network. Thus, in this case the reader 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive beacon signals from the tracking tags 102 and 104 and also to send and receive information with the server computing devices 108.

The one or more server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 11° C. for 30 minutes and (2) the tracking device is on a trip, which may indicate overheating of a cooled package or storage compartment. A second alert may be set for when (1) no motion is detected for 11 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the server computing devices 108 through a network.

Figure 2:
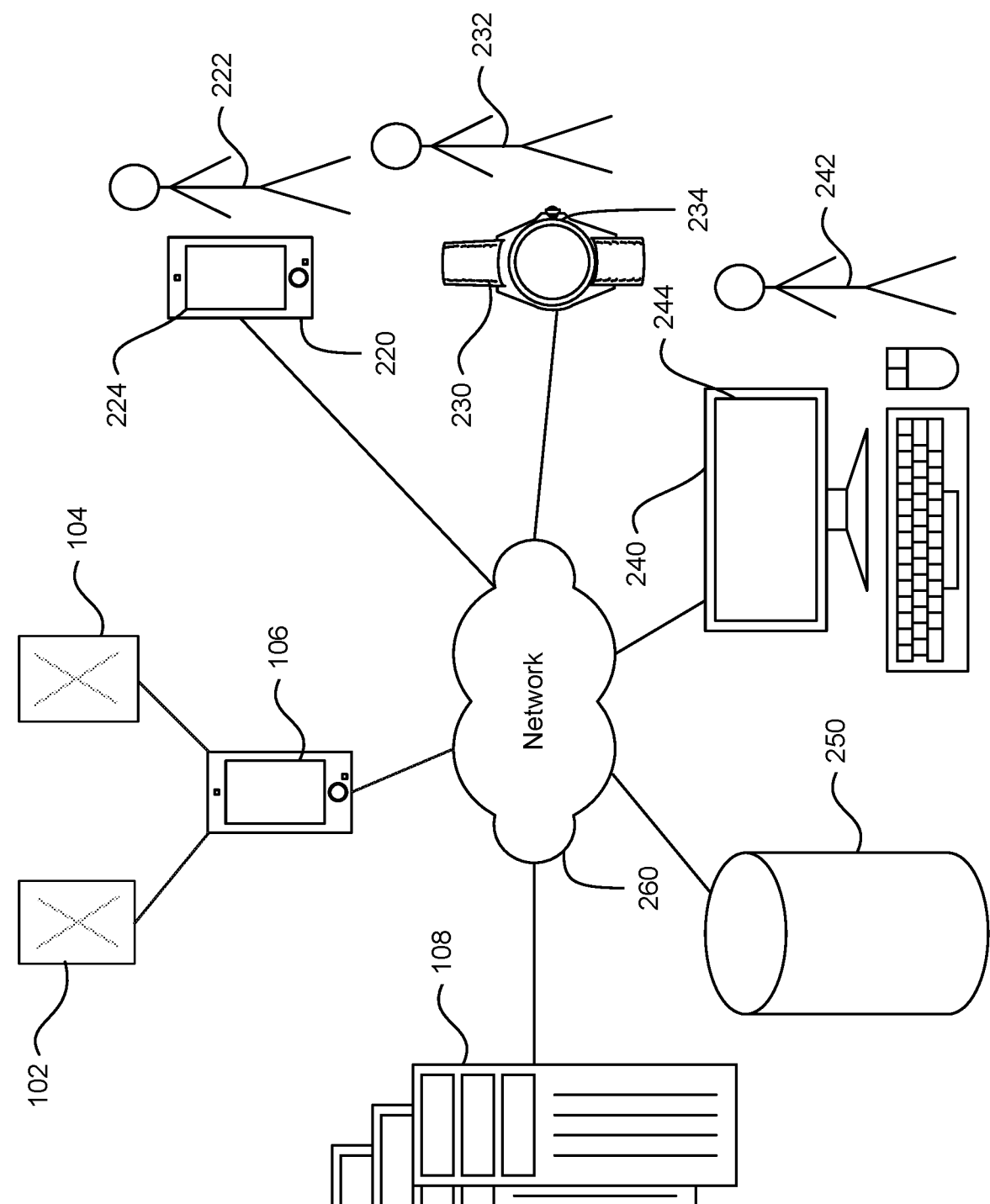
FIG. 2 is a pictorial diagram of an example network in accordance with aspects of the disclosure.
Figure 3:
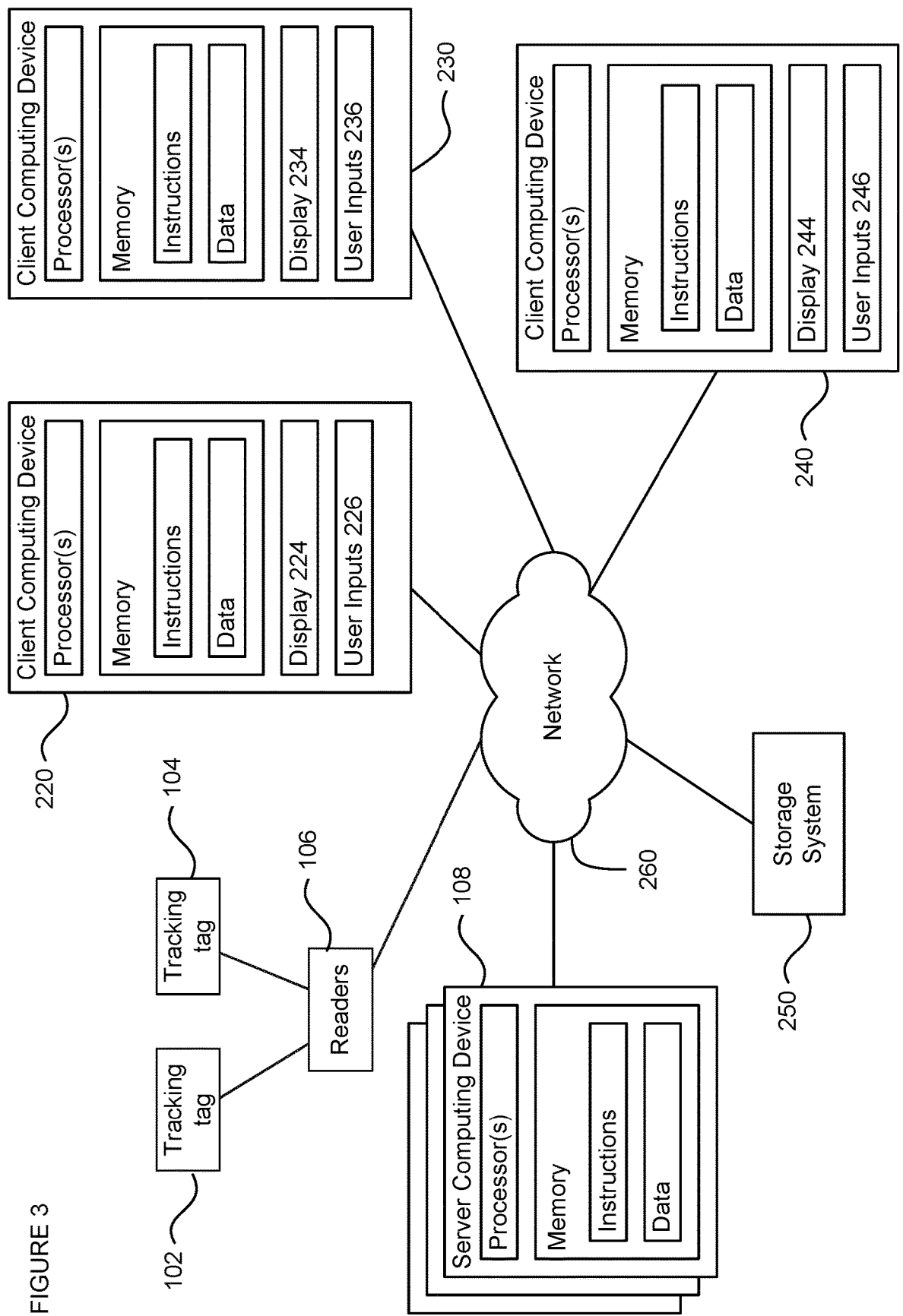
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of respective client computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

As with memory 112, storage system 250 can be of any type of computerized storage capable of storing information accessible by the one or more server computing devices 108, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2, and/or may be directly connected to or incorporated into any of the client computing devices 220, 230, 240. The storage system 250 may store information about the tracking tags including, for example, location, status (e.g., activated and when), identifiers, last update, sensor data (e.g., temperature, light, humidity, motion measurements), information about the object to which the tracking tag is attached (e.g., manufacturing data), and so on. In this regard, the information may be determined from received beacon signals provided to and updated at the storage system 250 by any of the one or more server computing devices 108 and/or client computing devices 220, 230, 240.

Figure 4A:
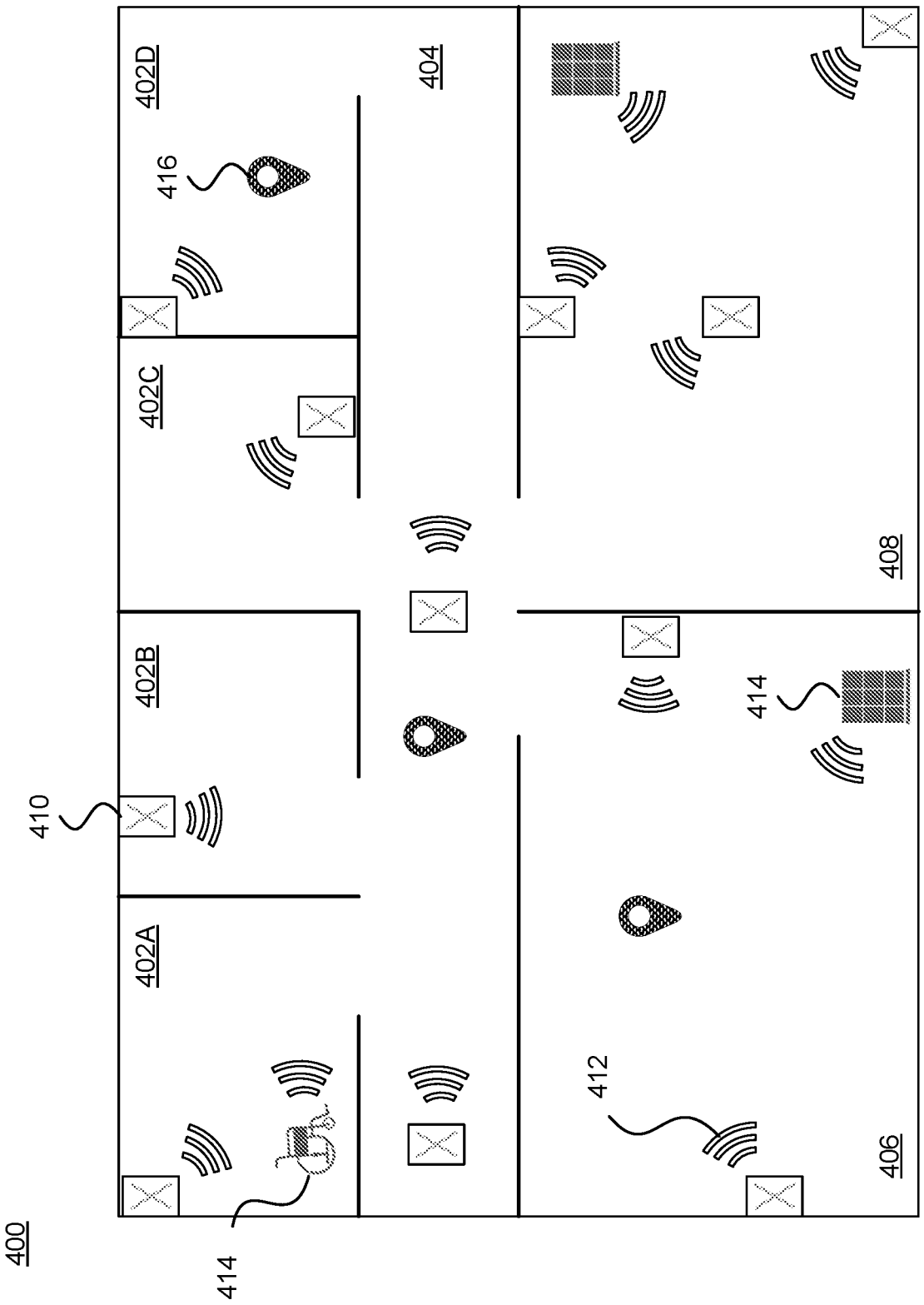
FIGS. 4A-B illustrate example scenarios in accordance with aspects of the disclosure.

FIG. 4A illustrates one example 400 of a system having a number of tracking tags arranged in various locations of a building (e.g., a hospital). In this example, there may be a number of rooms 402A-402D, such as patient rooms, along one side of a hallway 404. On the opposite side of the hallway 404 there is a storage room 406, such as to house equipment or supplies, as well as another room 408, which may be a meeting room, common area, rehab facility or the like. One or more fixed tracking tags 410 corresponding to the tracking tags 102 or 104 may be located in each room, including the hallway. Each fixed tracking tag 410 is configured to emit beacon signals 412 (e.g., RF signals in a selected frequency band according to a particular communication protocol). While the beacon signals 412 may appear directional, this need not be the case and the beacon signals may be transmitted omnidirectionally, for instance from a tracking tag 410 that is located on the ceiling, pillar or floor. In some implementations, the tracking tag 410 may be configured to emit beacon signals with information associated with its environment (e.g., temperature, light, humidity, motion, etc.).

Tracking tags 414 may correspond to tracking tags 102 or 104 when placed on a variety of objects (e.g., a case of supplies as shown in storage room 406 or a wheelchair shown in room 402A). In some instances, the tracking tags may also be configured to emit beacon signals with information associated with the object on which the tracking tag is applied (e.g., temperature, light, humidity, motion information, object details, and/or other detectable characteristics of the tracking device or its environment). Readers 416 may be found at various locations in the building, such as in a patient room, the storage room, the hallway or other location. Note that even if transmitted omnidirectionally, the beacon signals from a given tracking tag may be attenuated in a non-uniform manner due to the presence of walls, furniture, floors/ceilings, equipment, etc.

Figure 4B:
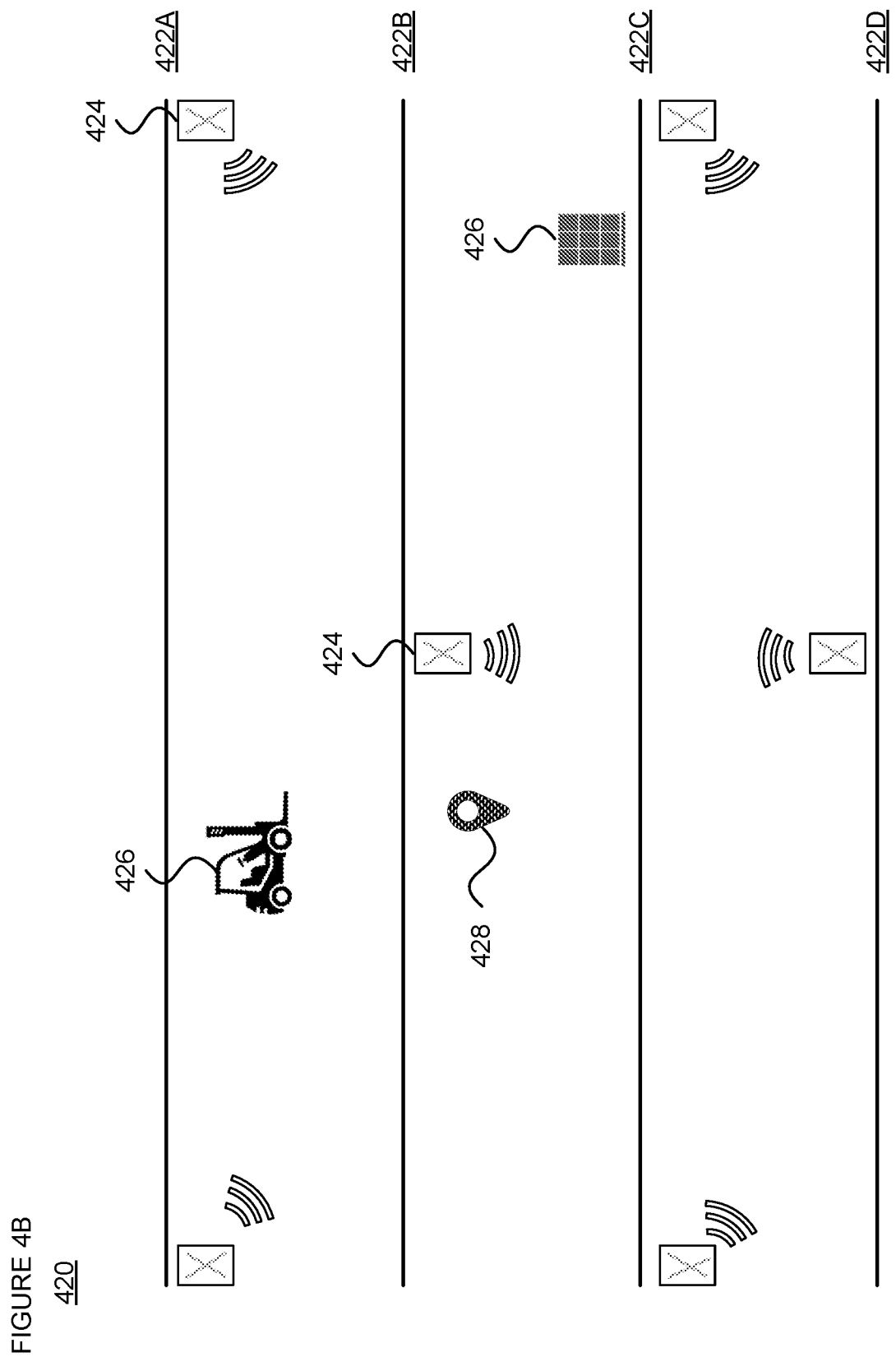

FIG. 4B illustrates another example 420 of a system having a number of fixed tracking tags positioned along different aisles in a warehouse setting. In this example, there are a number of aisles 422A-422D, although there may be more (or fewer) aisles, and the aisles may be arranged in other configurations than what is shown. Here, fixed tracking tags 424 are located at different places for the aisles, such as along aisle end caps, along the ceiling (or floor), on shelves, storage lockers, cabinets or other places along the aisle, etc. Similar to FIG. 4A, fixed tracking tags 426 are placed on or otherwise associated with different objects, such as a pallet of equipment or a forklift that retrieves items from their locations in the warehouse. As above, the fixed tracking tags are configured to transmit beacon signals that are detectable by one or more readers 428.

In order to determine the location of a given tracking tag, the system may use signal strength information obtained from the beacon signals of one or more tracking tags. A series of beacon signals may be ramped at different power levels (a ramped sequence). Evaluating the received beacon signals in view of their transmitted power can enable the system to determine which room or other location at which a given tracking tag is located. From that, the system is able to determine a location for a given tracking tag (and thus its corresponding object) with a suitable degree of certainty, such as by triangulating its position relative to the relevant tracking tags.

In order to enable the use of the aforementioned tracking tags on as many different types of objects and locations as possible, the tracking tags may be designed to be both thin and flexible. In addition, each tracking tag may be passive, such as a tracking tag configured to activate or be powered by environmental energy, or active, configured to include a battery or be coupled to another power source. In the case of a battery, delaying activation of the battery until the end user is ready to use the tracking tag is critical to extending the useful life of the tracking tag.

In order to enable the use of the aforementioned tracking tags on as many different types of articles to be shipped and other objects as possible, the tracking tags may be designed to be both thin and flexible. In this regard, the tracking tags may be configured as adhesive shipping labels (e.g., 4×6 shipping labels commonly used by logistics companies to ship packages such as envelopes, boxes, bags, etc.).

Figure 5A:
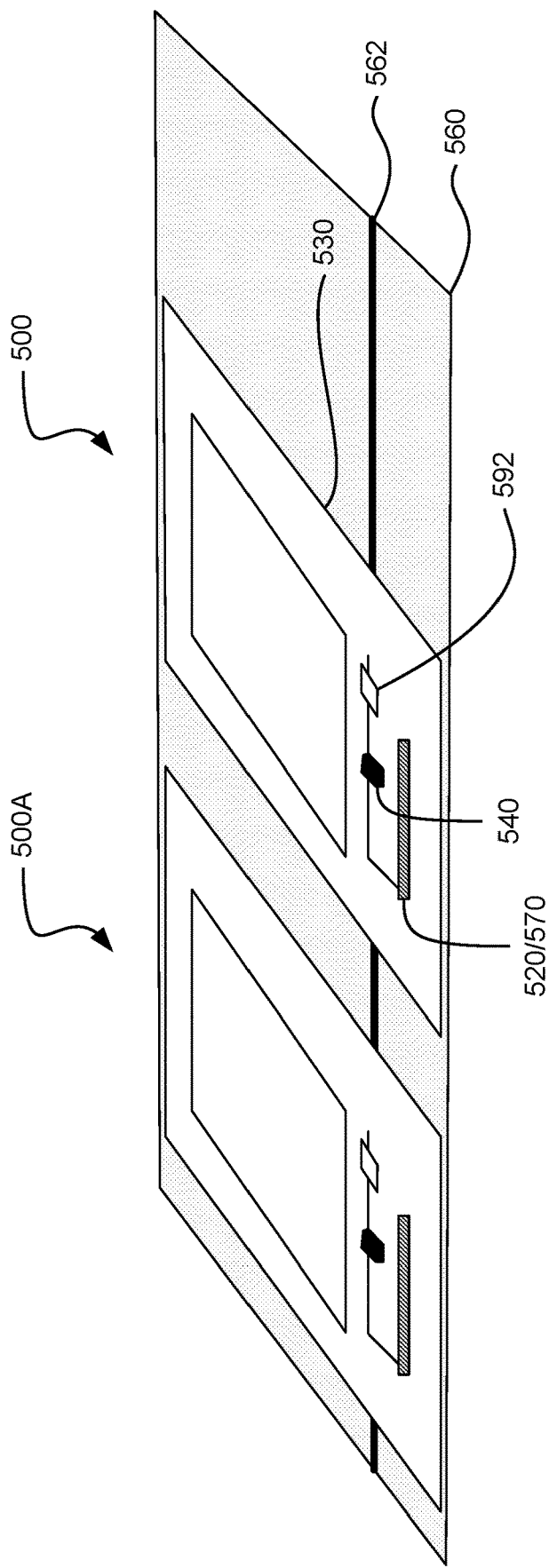
FIGS. 5A-E are example views of tracking tags in accordance with aspects of the disclosure.

Each tracking tag may include various components such as a top layer for printing a label, a flex inlay including beacon transmission circuitry, a bottom layer of adhesive (for attaching the tracking tag to an article to be shipped or another object). FIG. 5A is an example perspective view of tracking tag 500. 500A which may be configured the same as or similarly to any of the tracking tags 102, 104, 410, 414 described above. In this example, the tracking tag 500 includes a top layer 510 (not shown), a flex inlay 580 including beacon transmission circuitry 520, one or more batteries 530, and a processor 540, as well a bottom layer of adhesive 550 below the flex inlay 580.

Figures 5B, 5C:
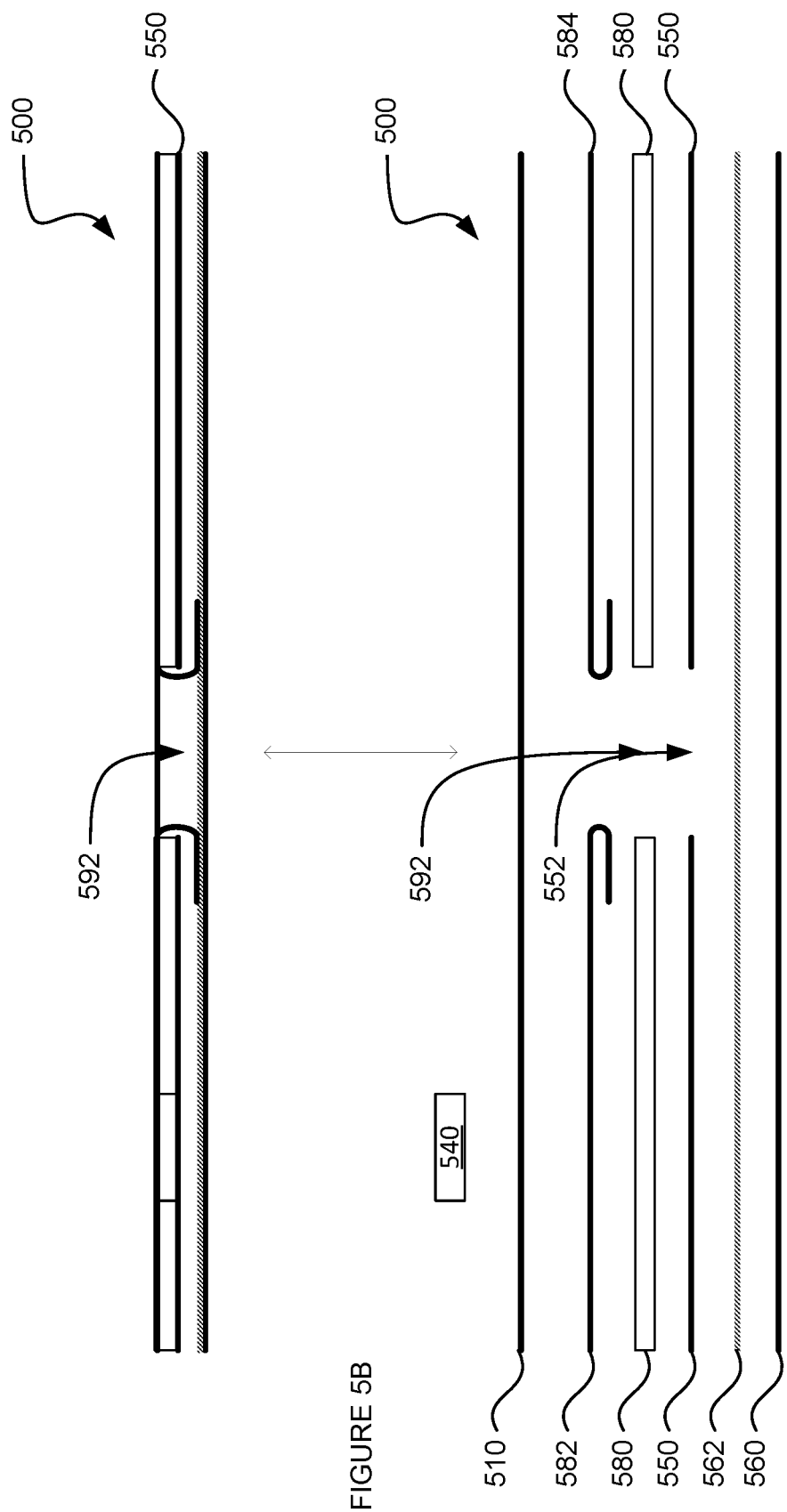

FIGS. 5B and 5C are detailed views of a portion of the tracking tag 500. The top layer 510 and bottom layer of adhesive 550 are identified in the break-away view of FIG. 5C. Tracking tag 500A may be configured and used the same or similarly to tracking tag 500.

The top layers may provide impact protection, prevent the ingress of liquids and other contaminants, as well as provide a smooth surface for applying labels or on which to print information (whether or not an additional adhesive label is not used). The top layer 510 may be a thin sheet (e.g., 0.1 mm) of polyester or paper with an adhesive backing. In this regard, the top layer 510 may be pressed onto the flex inlay 580. In this regard, the beacon transmission circuitry 520, one or more batteries 530, and processor 540 are arranged between the top layer 510 and the bottom layer of adhesive 550. In addition, the adhesive backing on the top layer may secure the top layer to the flex inlay, and the bottom layer of adhesive may be used to attach the tracking tag to an object (e.g., a package). As noted above, the adhesive backing may include commercially available glues or double-sided tapes such as those provided by 3M including 3M Double Coated Tape 93015LE.

The top layer 510 may be configured to be printed on during manufacturing and/or by the end user before application of the tracking tag on an object (e.g., a package, a wall, a shelf, etc.). For example, the end user may be able to print tracking and identifier information directly onto the top layer.

Figure 5D:
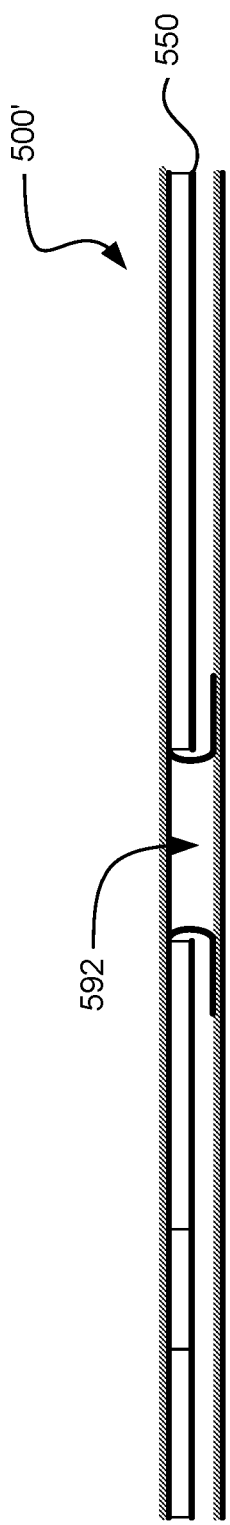
Figure 5E:
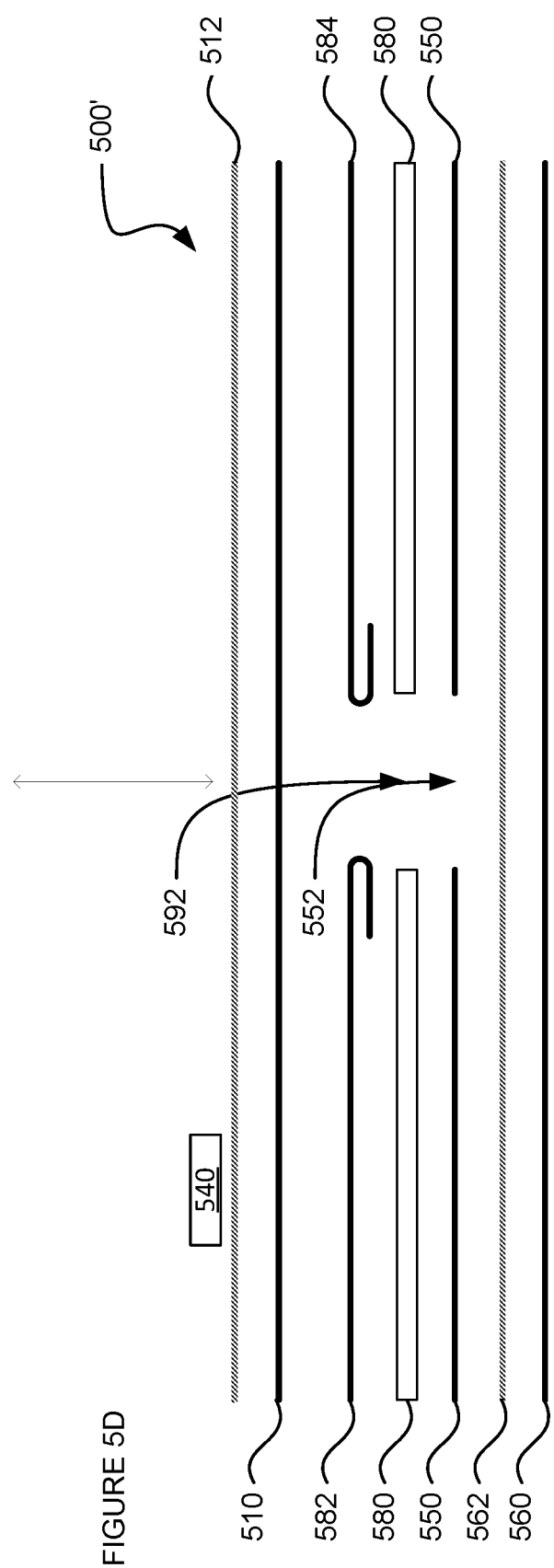

FIGS. 5D and 5E are detailed views of a portion of an alternative configuration for the tracking tag 500. As shown in FIGS. 5D and 5E, the tracking tags may include a separate label 512. In this example, the aforementioned identifier information may be printed onto the label 512 and applied to a surface (e.g., the top layer 510) of the tracking tag 500 when ready to use the tracking tag. In such instances, the top layer 510 may be a foam layer (e.g., a foam gasket). The label 512 may include proprietary labels or commercially available labels such as those provided by AVERY including the Avery Ultra Duty White Film 94211. The tracking tag depicted in FIGS. 7C and 7D may otherwise be configured and used the same or similarly to the tracking tags depicted in FIGS. 7A and 7B.

The beacon transmission circuitry 520 may include a printed circuit board (PCB) and one or more batteries. The PCB may include various features such as an identifier chip and/or a transmission device for the purposes of transmitting beacon signals. The PCB may be a commercially available PCB which can be connected to one or more batteries. For example, the PCB may include PCBs such as surface mount technology (SMT) PCBs including devices that enable BLUETOOTH LE 4.0 technology for the purposes of enabling the aforementioned beacon signals.

Figure 6B:
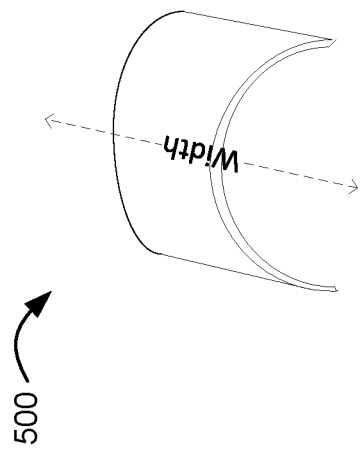
FIGS. 6A-B are example views of tracking tags in accordance with aspects of the disclosure.
Figure 6A:
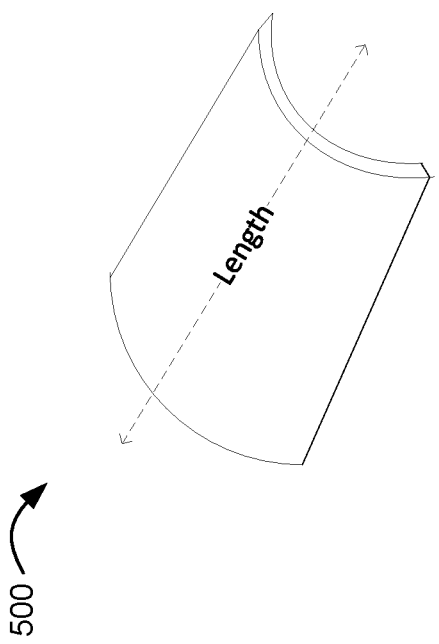

The one or more batteries 530 may be relatively thin. For example, the one or more batteries 530 may include a coin cell, prismatic, pouch, thin-film, or screen-printed battery. For example, as depicted in FIG. 5A, the one or more batteries 530 is a thin film battery. In this example, the thin film battery may be a commercially available thin-film MOLEX 13299-0002 battery, CPO042350 battery provided by RENATA BATTERIES, etc. In this regard, given the configuration of the tracking tag 500, this may allow for bending along the length of the tracking tag 500 as depicted in FIG. 6A as well as along the width of the tracking tag 500 as depicted in FIG. 6B.

Alternatively, coin cell batteries, such as CR2016, CR1216, CR1220, CR2012, etc. may be used. Coin cell batteries are typically used in powered badges and key cards and provided various benefits such as improved safety (e.g., because of a metal encased battery with reduced puncture danger as compared to thin-film batteries), higher capacity or rather longer life for extended runtime operations, lower costs, easier storage (for example, coin cell batteries usually slot into a battery holder and thus can be stored separately and installed closer to time of use which may also allow tracking tags to be stored in facilities not rated for battery storage whereas flatpack or other custom batteries are typically bonded to the device at manufacturing), lower lead times (e.g., for manufacture and availability), and so on.

In addition, although coin cell batteries do not bend, their smaller form factor may allow for lower stiffness in the tracking tag. In other words, the tracking tag may be more tolerant to bending at points away from the coin cell battery whereas for a thin-film battery, bending should be avoided in order to prevent damage to the thin-film battery which may have a larger form factor. The further the rigid portions are located away from one another and the PCB, the greater the amount of flexibility that can be achieved. In this regard, given the configuration of the tracking tag 500, bending along the length of the tracking tag 500 as depicted in FIG. 6A may be less desirable (e.g., likely to cause damage to the rigid components) than bending along the width of the tracking tag 500 as depicted in FIG. 6B.

The processor 540 may be configured the same or similarly to processors 110 and may include conventional processors, such as commercially available CPUs. For instance, the processor 540 may also include BLUETOOTH radio capabilities such as the NORDIC SEMICONDUCTOR nRF52832 or INPLAY IN100. In some instances, the processor 540 may actually comprise multiple processors that may or may not be stored within the same physical housing.

In some instances, the tracking tag may include a flex inlay 580 to provide additional support to the tracking tag. For example, the flex inlay may be formed from various materials such as polycarbonates or other plastics such as cellulose fiber (paper/wood), polyethylene (PE/LDPE/HDPE), polypropylene (PP), Vinyl (PVC), Nylon, Polyurethane (foam), rubber, silicone, resin, carbon fiber. The flex inlay may be die-cut, molded or manufactured using other processes. The materials of the flex inlay may be selected in order to enable the flex inlay to be strong and puncture resistant while also flexible. In this regard, the flex inlay may enable the tracking tag 500 to be attachable to objects (via the bottom layer of adhesive 550) of various shapes including curved surfaces, such as depicted in FIGS. 6A and 6B.

In some instances, a liner sheet or liner material, such as liner material 560 of FIGS. 5A-5E, may be used to protect the adhesive before the tracking tag is attached to an object. The liner material 560 may allow adhering multiple tracking tags to the liner material during manufacturing and may be either rolled or folded into one continuous strip of labels to feed into a printer. For instance, before using the tracking tag 500 may be attached to the liner material 560 such as craft or other paper to protect the adhesive on the bottom layer of the bottom surface before use. In such instances, the tracking tags may be provided on a roll which can be run through a printer to enable printing of information on the top layer of the tracking tags. In this regard, the tracking tags 500, 500A of FIG. 5A may represent a small portion of a larger roll which has been unrolled. Thus, a plurality of the tracking tags (e.g., more than 2, and potentially hundreds or thousands) may be manufactured on a roll of the liner material 560, such as a waxed paper liner or other appropriate backing, which allows the tracking tags to be printed.

When in use, each tracking tag may be peeled off of the roll of liner material and applied to an article to be shipped or another object by a human operator. In this regard, before applying the tracking tag 500 to an object, the tracking tag may be removed from the liner material (e.g., peeled away) in order to expose the bottom layer of adhesive 550. As noted above, the tracking tag may be printed on during manufacturing and/or by a human operator before removal from the liner material application of the tracking tag on a package to be shipped or another object. Thereafter the tracking tag 500 may be attached to a package.

The tracking tags may also include an activation mechanism configured to activate the tracking tag and initiate transmission of beacon signals by the beacon transmission circuitry. An initially closed circuit may connect to the one or more batteries 530 (e.g., at a terminal) and the processor 540 in order to enable the processor to monitor the continuity of the closed circuit. The initially closed circuit may include conductive materials such as metals, carbon or graphite traces and may also connect to ground or alternatively other pins of the processor to enable the same monitoring capabilities. The initially closed circuit may be at least initially completed via a metalized feature of the liner material 560 as discussed further below. In this regard, when the tracking tag 500 is removed (e.g., by peeling) from the liner material 560, the continuity of the initially closed circuit is broken, activating the tracking tag and enabling the transmission of beacon signals which allow a tracking system to track the location of the tracking tag (as well as the article or another object to which the tracking tag is attached.

In each of FIGS. 5A-5E, a conductive strip 562 may be embedded within liner material 560 or arranged as an additional piece of copper tape. The conductive strip may be connected to a flip chip as well as the one or more batteries 530 or ground. The flip chip may include the processor 540 may be arranged on the PCB. The PCB may be formed from a top layer of conducting traces formed from copper foil, a substrate layer or flex inlay (e.g., non-conductive dielectric material such as Polyimide or PET), and a bottom layer of conducting traces formed from copper foil or other conductive materials. As noted above, the top layer of the tracking tag 500 is not depicted in FIG. 5A. In this example, an antenna 570, 770 of the beacon transmission circuitry 520 is depicted as connected to the processor 540.

FIGS. 5B-5E depict a cross-sectional view through an area 592 of the tracking tag 500 as well as a break away view of the tracking tag 500. In the example of FIGS. 5A-5E, the beacon transmission circuitry is mounted to the flex inlay 580 and interconnected by conductive traces 582, 584 on the surface of the flex inlay. A section of the conductive traces 582, 584 on the flex inlay may be cut into two opposite or opposing flaps 586, 588 which are folded through the flex inlay 580 at area 592 and through the bottom layer of adhesive 550 at location 552. In this example, the tracking tag 500, 500A is initially arranged on liner material 560.

In addition, the conductive strip 562 may extend along a length of the liner material. Alternatively, the liner material may be metalized to provide a conductive connection and may include, for example, commercially available metalized liners. Alternatively, the initially closed circuit may include a metalized rivet which passes through the flex inlay, but not the liner. By removing the rivet from the liner, the initially closed circuit may be broken, activating the tracking tag.

When the flex inlay 580 is adhered to the liner material 560, the conductive traces on the folded flaps 586, 588 may contact the conductive strip 562 or the metalized liner, which completes an initially closed circuit, here a pull down circuit to the chip-enable pin of the flip chip keeping the flip chip in low power idle mode. When the flex inlay 580 (and the tracking tag 500, 500A) is removed from (e.g. peeled off of) the liner material 560, the initially closed circuit is broken, this may allow a weak pullup to turn on the chip-enable and activate the flip chip. This, in turn, may activate the tracking tag 500, 500A and enable the transmission of beacon signals which allow a tracking system to track the location of the tracking tag (as well as the article or another object to which the tracking tag is attached.

Figure 7A:
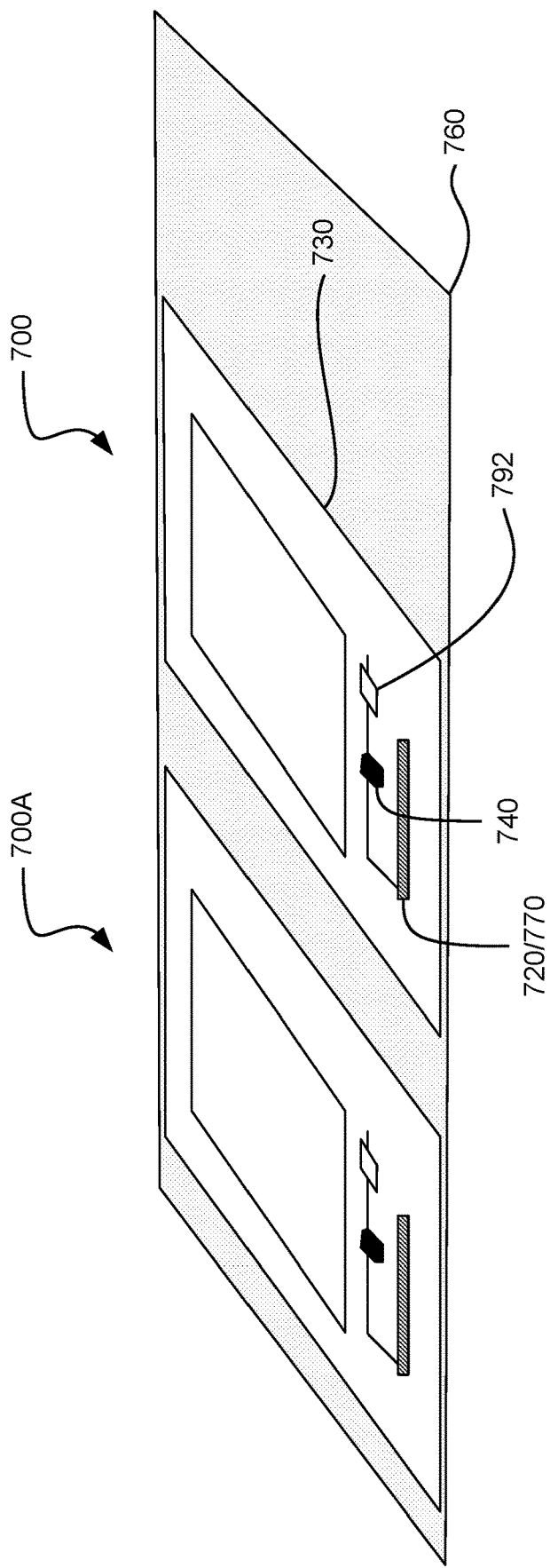

FIGS. 7A-7C are example perspective views and breakaway view, respectively, of tracking tag 700 which may be configured similarly to any of the tracking tags 102, 104, 410, 414, 500 described above with a top layer 710 (corresponding to top layer 510, not depicted in FIG. 7A, and identified in FIG. 7C), beacon transmission circuitry 720 (corresponding to beacon transmission circuitry 520), one or more batteries 730 (corresponding to the one or more batteries 530), a processor 740 (corresponding to the processor 540), a bottom layer of adhesive 750 (corresponding to the bottom layer of adhesive 550 and identified in FIGS. 7C and 7E), beacon transmission circuitry 720 (corresponding to the beacon transmission circuitry 520 and shown in FIG. 7B), and so on.

FIGS. 7D and 7E are detailed views of a portion of an alternative configuration for the tracking tag 700 (here tracking tag 700'). As shown in FIGS. 7D and 7E, the identifier information may be printed onto a separate label 712. In this example, the aforementioned identifier information may be printed onto the label 712 and applied to a surface (e.g., the top layer 710) of the tracking tag 700' when ready to use the tracking tag. In such instances, the top layer

710 may be a foam layer (e.g., a foam gasket). The label 512 may include proprietary labels or commercially available labels such as those provided by AVERY including the Avery Ultra Duty White Film 94211. The tracking tag 700' depicted in FIGS. 7C and 7D may otherwise be configured and used the same or similarly to the tracking tag 700 depicted in FIGS. 7A-C.

As with the tracking tags 500, 500A, the tracking tags 700, 700A may also include an activation mechanism configured to activate the tracking tag and initiate transmission of beacon signals by the beacon transmission circuitry. An initially closed circuit may connect to the one or more batteries 730 (e.g., at a terminal) and the processor 740 in order to enable the processor to monitor the continuity of the closed circuit. The initially closed circuit may also connect to ground or alternatively other pins of the processor to enable the same monitoring capabilities. The initially closed circuit may be at least initially completed via a portion 784 of a conductive trace 782 which is routed through an area 792 of the flex inlay 780 and completes the initially closed circuit.

FIGS. 7B-7E depict a cross-sectional view through an area 792 of the tracking tag 700 as well as a perspective view of the tracking tag 700. In the example of FIGS. 7A-7E, the beacon transmission circuitry is mounted into or onto a flex inlay 780 and interconnected by the conductive trace 782. As noted above portion 784 of the conductive trace 782 is routed through the area 792 of the flex inlay (depicted as shaded) which may be die cut but not yet separated. During a die-cut process the outline of the label may be cut out down to the liner level so the resulting peeled-off label meets certain desired dimension specifications while allowing the liner material and the initially closed circuit between adjacent labels to remain intact though perforated. The die cut process may be an additional step in the manufacturing process.

The conductive trace on the flex inlay remains whole (i.e., is unbroken) through area 792 prior to removal of the tracking tag 700, 700A from the liner material 760. In this example, the tracking tag 700 is initially arranged on liner material 760 corresponding to the liner material 560. As discussed further below, when the tracking tag 700 is removed (e.g., by peeling) from the liner material 760, the area 792 is broken and continuity of the initially closed circuit is broken. This may activate the tracking tag and enabling the transmission of beacon signals which allow a tracking system to track the location of the tracking tag (as well as the article or another object to which the tracking tag is attached.

In each of FIGS. 7A-7E, the area 792 may be connected to a flip chip as well as the one or more batteries 530 or ground forming an initially closed circuit. The flip chip may include the processor 540 (as well as other features such as sensors for detecting light, humidity, motion, temperature, etc. not depicted), one or more batteries, and may be arranged on the PCB. The PCB may be formed from a top layer of conducting traces formed from copper foil, a substrate layer or flex inlay (e.g., non-conductive dielectric material such as Polyimide or PET), and a bottom layer of conducting traces formed from copper foil. As noted above, the top and bottom layers of the tracking tag are not depicted. In this example, an antenna 770 of the beacon transmission circuitry 720 is depicted as connected to the processor 740. As with the liner material 560, the liner material 760 may be used to protect the adhesive before the tracking tag is attached to an object. The liner material 760 may allow adhering multiple tracking tags to the liner material during manufacturing and may be either rolled or folded into one continuous strip of labels to feed into a printer. For instance, before using the tracking tag 700 may be attached to the liner material 760 such as craft or other paper to protect the adhesive on the bottom layer of the bottom surface before use. In such instances, the tracking tags may be provided on a roll which can be run through a printer to enable printing of information on the top layer of the tracking tags. In this regard, the tracking tags 700, 700A of FIG. 7A may represent a small portion of a larger roll which has been unrolled. Thus, a plurality of the tracking tags may be manufactured on a roll of the liner material 760, such as a waxed paper liner or other appropriate backing, which allows the tracking tags to be printed.

As with the tracking tags 500, 500A, 500' when in use, each tracking tag 700, 700A, 700' may be peeled off of the roll of liner material and applied to an article to be shipped or another object by a human operator. In this regard, before applying the tracking tag 700 to an object, the tracking tag may be removed from the liner material (e.g., peeled away) in order to expose the bottom layer of adhesive 750. As noted above with regard to tracking tag 500, the tracking tag 700, 700' may be printed on during manufacturing and/or by a human operator before removal from the liner material application of the tracking tag on a package to be shipped or another object. Thereafter the tracking tag 700, 700' may be attached to a package.

When the flex inlay 780 is adhered to the liner material 760, the conductive trace 782 may contact the processors 740 and one or more batteries 730, which completes an initially closed circuit, here a pull down circuit to the chip-enable pin of the flip chip keeping the flip chip in low power idle mode. An additional adhesive 786, such as 3M high-strength acrylic adhesives including 300LSE series pressure sensitive adhesive (PSA) or other commercially available adhesives, which is stronger than the bottom layer of adhesive 750, may be included between the portion 784 and the liner material 760. When the flex inlay 780 (and the tracking tag 700) is removed from (e.g., peeled off of) the liner material 760, this additional adhesive may remain stuck to the liner material and portion 784, causing the portion 784 (routed through the flex inlay 780) to break. Thus, when the flex inlay 780 (and the tracking tag 700) is removed from the liner, the initially closed circuit is broken, allowing a weak pullup to turn on the chip-enable and activate the flip chip. This, in turn, may activate the tracking tag 700, 700' and enable the transmission of beacon signals which allow a tracking system to track the location of the tracking tag (as well as the article or another object to which the tracking tag is attached.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
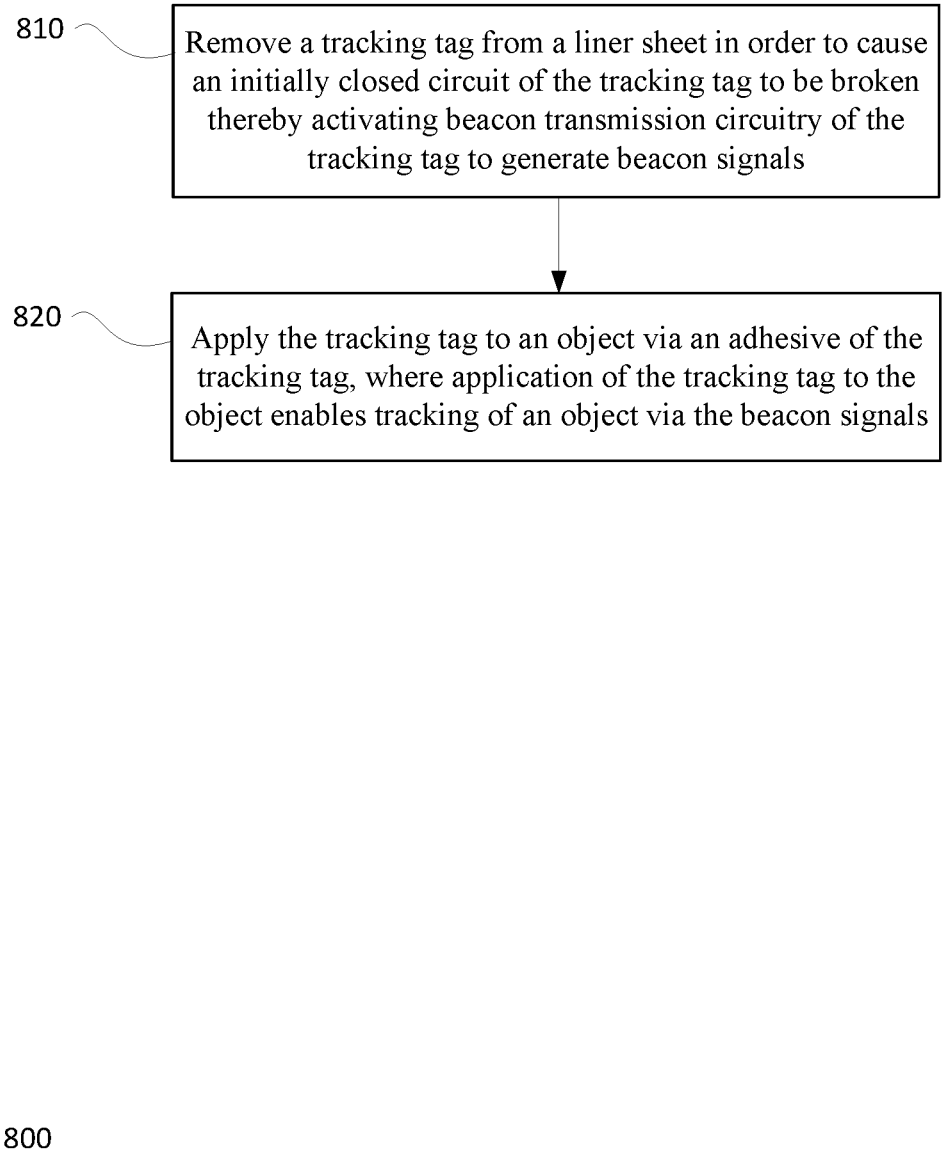
FIG. 8 is an example flow diagram in accordance with aspects of the disclosure.

FIG. 8 is an example flow diagram 800 depicting an example method for activating a tracking tag, such as a tracking tag 500, arranged on a liner material, such as liner material 560. Such a method may be performed by a human operator, robot or other mechanical device. At block 810, the tracking tag is removed from the liner material. Removing the tracking tag from the liner material causes an initially closed circuit of the tracking tag to be broken thereby activating beacon transmission circuitry of the tracking tag to generate beacon signals.

As in the example of tracking tags 500 and 700, when the tracking tags are removed (e.g., by peeling) from the liner material 560, 760, continuity of the initially closed circuits is broken. This may activate the tracking tags and enabling the transmission of beacon signals which allow a tracking system to track the location of the tracking tag (as well as the article or another object to which the tracking tag is attached.

At block 820, the tracking tag is applied to an object via an adhesive of the tracking tag. As noted above, the tracking tag 500, 700 may be applied, pressed onto or otherwise attached to an object via the bottom layer of adhesive 550, 750. Application of the tracking tag 500, 700 to the object, such as a package, envelope, box, etc., enables tracking of the object via the beacon signals. For instance, the initially closed circuit of the tracking tag 500, 700 connect the one or more batteries 530, 730 of the tracking tag to the processor 540, 740 of the tracking tag, and removing the tracking tag from the liner material 560, 760 enables the one or more batteries to power the processor as well as the beacon transmission circuitry 520, 720. In response, the processor 540, 740 may send a signal which activates the beacon transmission circuitry 520, 720.

The features described herein may provide for a simple, cost effective and useful tracking tag which can be automatically activated without additional steps. The features described herein may also provide for highly reliable tracking tags which are very unlikely to become activated inadvertently and which are more readily manufacturable than previous tracking tags. In addition, logistics companies need not change existing shipping processes by adding additional steps in order to activate a tracking tag. Rather labels may be printed and applied to boxes or envelopes per usual and each tracking tag is automatically activated. Thus, the addition of the benefits of beacon-based tracking will not add additional labor costs. In many instances, this may prevent a human operator from inadvertently forgetting to activate a tracking tag.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same as or similarly elements.

The invention claimed is:

1. A system comprising:
   liner material including a conductive portion; and
   a tracking tag at least initially arranged on the liner material, the tracking tag including a top layer, beacon transmission circuitry, a bottom layer of adhesive, and an activation mechanism configured to activate the tracking tag and cause the beacon transmission circuitry to transmit beacon signals in order to enable tracking of the tracking tag, wherein the activation mechanism includes an initially closed circuit between the tracking tag and the conductive portion of the liner material, and wherein the activation mechanism is configured to automatically activate the tracking tag when the tracking tag is removed from the liner material.

2. The system of claim 1, wherein conductive portion is a conductive strip of copper.

3. The system of claim 1, wherein the conductive portion is metalized.

4. The system of claim 1, wherein the liner material is configured to protect the bottom layer of adhesive before the tracking tag is attached to an object.

5. The system of claim 1, wherein the initially closed circuit connects one or more batteries to a processor configured to activate the beacon transmission circuitry when the initially closed circuit is broken.

6. The system of claim 1, wherein the initially closed circuit is configured such that breaking the initially closed circuit activates the tracking tag and causes the beacon transmission circuitry to transmit the beacon signals.

7. A method for activating a tracking tag arranged on a liner material, the method comprising:
   removing the tracking tag from the liner material, wherein removing the tracking tag from the liner material causes an initially closed circuit between the tracking tag and a conductive portion of the liner material to be broken, thereby separating the tracking tag from the conductive portion and activating beacon transmission circuitry of the tracking tag to generate beacon signals.

8. The method of claim 7, wherein the conductive portion is a conductive strip of copper.

9. The method of claim 7, wherein the conductive portion is metalized.

10. The method of claim 7, further comprising, attaching the tracking tag to an object, and wherein the liner material is configured to protect an adhesive backing of the tracking tag before the tracking tag is attached to an object.

11. A system comprising:
    liner material; and
    a tracking tag at least initially arranged on the liner material, the tracking tag including a top layer, beacon transmission circuitry, a flex inlay, a conductive trace, a bottom layer of adhesive, and an activation mechanism configured to activate the tracking tag and cause the beacon transmission circuitry to transmit beacon signals in order to enable tracking of the tracking tag, wherein the activation mechanism includes an initially closed circuit including a portion of the conductive trace routed through an area of the flex inlay, and wherein the activation mechanism is configured to automatically activate the tracking tag when the tracking tag is removed from the liner material by breaking the portion of the conductive trace.

12. The system of claim 11, wherein the area is die-cut to enable the breaking of the portion of the conductive trace.

13. The system of claim 11, wherein the liner material is configured to protect the bottom layer of adhesive before the tracking tag is attached to an object.

14. The system of claim 11, wherein the initially closed circuit connects one or more batteries to a processor configured to activate the beacon transmission circuitry when the initially closed circuit is broken.

15. The system of claim 11, wherein the initially closed circuit is configured such that breaking the initially closed circuit activates the tracking tag and causes the beacon transmission circuitry to transmit the beacon signals.

16. A method for activating a tracking tag arranged on a liner material, the method comprising:
    removing the tracking tag from the liner material, wherein removing the tracking tag from the liner material causes an initially closed circuit including a portion of a conductive trace routed through an area of a flex inlay of the tracking tag, and wherein an activation mechanism is configured to automatically activate the tracking tag when the tracking tag is removed from the liner material by breaking the portion of the conductive trace.

17. The method of claim 16, wherein the area is die-cut to enable the breaking of the portion of the conductive trace.

18. The method of claim 16, further comprising, attaching the tracking tag to an object, and wherein the liner material is configured to protect an adhesive backing of the tracking tag before the tracking tag is attached to an object.

* * * * *

UNITED STATES PATENT AND TRADEMARK OFFICE
CERTIFICATE OF CORRECTION

PATENT NO. : 12,353,937 B2
APPLICATION NO. : 18/229001
DATED : July 8, 2025
INVENTOR(S) : Dean Mamoru Kawaguchi and Russell Shikami It is certified that error appears in the above-identified patent and that said Letters Patent is hereby corrected as shown below:

In the Claims

Claim 2, Column 16, Line 6:
Now reads: "wherein conductive portion"; should read -- wherein the conductive portion --

Signed and Sealed this
Twelfth Day of August, 2025

Coke Morgan Stewart
*Acting Director of the United States Patent and Trademark Office*